United States Patent
Bradean et al.

(10) Patent No.: US 7,955,739 B2
(45) Date of Patent: Jun. 7, 2011

(54) SHUTDOWN METHODS AND DESIGNS FOR FUEL CELL STACKS

(75) Inventors: Radu P. Bradean, Vancouver (CA); Herwig R. Haas, Vancouver (CA); Christopher J. Richards, New Westminster (CA); David D. L. Adam, North Vancouver (CA)

(73) Assignee: BDF IP Holdings Ltd., Vancouver, BC (CA)

( * ) Notice: Subject to any disclaimer, the term of this patent is extended or adjusted under 35 U.S.C. 154(b) by 1337 days.

(21) Appl. No.: 11/374,666

(22) Filed: Mar. 13, 2006

(65) Prior Publication Data

US 2006/0210856 A1 Sep. 21, 2006

Related U.S. Application Data

(60) Provisional application No. 60/661,191, filed on Mar. 11, 2005.

(51) Int. Cl.
*H01M 8/00* (2006.01)
(52) U.S. Cl. ........ 429/400; 429/419; 429/428; 429/429; 429/433; 429/434; 429/436
(58) Field of Classification Search ............ 429/13, 429/400, 419, 428, 429, 433, 434, 436, 471
See application file for complete search history.

(56) References Cited

U.S. PATENT DOCUMENTS

| | | |
|---|---|---|
| 2002/0076582 A1 | 6/2002 | Reiser et al. ............ 429/13 |
| 2002/0076583 A1 | 6/2002 | Reiser et al. ............ 429/13 |
| 2003/0031899 A1 | 2/2003 | Margiott et al. ......... 429/13 |
| 2004/0001981 A1 | 1/2004 | Resnick et al. .......... 429/13 |
| 2004/0029905 A1 | 2/2004 | Christoph ............ 514/282 |
| 2004/0247965 A1 | 12/2004 | Resnick et al. |
| 2005/0084735 A1* | 4/2005 | Breault ................ 429/38 |

FOREIGN PATENT DOCUMENTS

| | | |
|---|---|---|
| CA | 2 379 363 | 9/2002 |
| JP | 62131478 A | 6/1987 |
| JP | 8-306380 | 11/1996 |
| JP | 2001-15138 | 1/2001 |
| WO | WO 00/65676 | 11/2000 |
| WO | WO 2004/107839 A2 | 12/2004 |
| WO | WO 2004/109822 A2 | 12/2004 |
| WO | WO 2005/029617 A2 | 3/2005 |

\* cited by examiner

*Primary Examiner* — Jane Rhee
(74) *Attorney, Agent, or Firm* — Seed IP Law Group PLLC

(57) ABSTRACT

Improved water distribution can be obtained within the cells of a fuel cell series stack by maintaining a suitable temperature difference between the cathode and anode sides of each cell in the stack during shutdown. This can be accomplished by thermally insulating the "hot" end and sides of the stack and by providing a thermal mass adjacent to the "hot" end.

9 Claims, 9 Drawing Sheets

SHUTDOWN METHODS AND DESIGNS FOR FUEL CELL STACKS

CROSS-REFERENCE TO RELATED APPLICATION

This application claims the benefit under 35 U.S.C. §119 (e) of U.S. Provisional Patent Application No. 60/661,191 filed Mar. 11, 2005, which is incorporated herein by reference in its entirety.

BACKGROUND OF THE INVENTION

1. Field of the Invention

The invention relates to methods and designs for obtaining improved water distribution within the cells of a fuel cell series stack during shutdown and, more particularly, to the shutdown of solid polymer electrolyte fuel cell stacks.

2. Description of the Related Art

Fuel cell systems are presently being developed for use as power supplies in a wide variety of applications, such as stationary power plants and portable power units. Such systems offer the promise of economically delivering power while providing environmental benefits.

Fuel cells convert fuel and oxidant reactants to generate electric power and reaction products. They generally employ an electrolyte disposed between cathode and anode electrodes. A catalyst typically induces the desired electrochemical reactions at the electrodes.

A preferred fuel cell type, particularly for portable and motive applications, is the solid polymer electrolyte (SPE) fuel cell, which comprises a solid polymer electrolyte membrane and operates at relatively low temperatures.

SPE fuel cells employ a membrane electrode assembly (MEA) that comprises the solid polymer electrolyte or ion-exchange membrane disposed between the cathode and anode. Each electrode contains a catalyst layer, comprising an appropriate catalyst, located next to the solid polymer electrolyte membrane. The catalyst is typically a precious metal composition (e.g., platinum metal black or an alloy thereof) and may be provided on a suitable support (e.g., fine platinum particles supported on a carbon black support). The catalyst layers may contain an ionomer similar to that used for the solid polymer electrolyte membrane (e.g., Nafion®). The electrodes may also contain a porous, electrically conductive substrate that may be employed for purposes of mechanical support, electrical conduction, and/or reactant distribution, thus serving as a fluid diffusion layer. Flow field plates for directing the reactants across one surface of each electrode or electrode substrate, are disposed on each side of the MEA. In operation, the output voltage of an individual fuel cell under load is generally below one volt. Therefore, in order to provide greater output voltage, numerous cells are usually stacked together and are connected in series to create a higher voltage fuel cell series stack.

During normal operation of a SPE fuel cell, fuel is electrochemically oxidized at the anode catalyst, typically resulting in the generation of protons, electrons, and possibly other species depending on the fuel employed. The protons are conducted from the reaction sites at which they are generated, through the electrolyte, to electrochemically react with the oxidant at the cathode catalyst. The electrons travel through an external circuit providing useable power and then react with the protons and oxidant at the cathode catalyst to generate water reaction product.

In some fuel cell applications, the demand for power can essentially be continuous and thus the stack may rarely be shutdown (such as for maintenance). However, in many applications (e.g., automotive), a fuel cell stack may frequently be stopped and restarted with significant storage periods in between. Such cyclic use can pose certain problems in SPE fuel cell stacks. For instance, in U.S. Patent Application Publication Nos. US 2002/0076582 and US 2002/0076583, it is disclosed how conditions leading to cathode corrosion can arise during startup and shutdown and that corrosion may be reduced by rapidly purging the anode flow field with an appropriate fluid.

Other problems that can arise from cyclic use relate to the water content remaining and its distribution in the stack after shutdown. For instance, liquid water accumulations in the stack can result from too much water remaining and/or undesirable distribution during shutdown. Such accumulations of liquid water can adversely affect cell performance by blocking the flow of reactants and/or by-products. Perhaps even worse, if the fuel cell stack is stored at below freezing temperatures, liquid water accumulations in the cells can freeze and possibly result in permanent damage to the cells. On the other hand, with too little water remaining, the conductivity of the membrane electrolyte can be substantially reduced, with resulting poor power capability from the stack when restarting.

PCT application No. US2004/029905 filed Sep. 10, 2004 by the same applicant discloses shutdown methods and stack designs that allow for a desirable distribution of liquid water within the stack upon shutdown and thereby provide for improved freeze start performance. Appropriate thermal gradients are employed during shutdown to achieve the desirable liquid water distribution. In a related manner, PCT application WO2004/107839 also discloses methods of maintaining fuel cell performance despite freeze/thaw cycles by employing a thermal gradient to cause appropriate water migration. Therein, the methods establish a gradient in which the fuel cell cathode is hotter than the anode.

The present invention relates to improved methods and designs for achieving a desirable thermal gradient and hence liquid water distribution upon shutdown of a stack.

BRIEF SUMMARY OF THE INVENTION

A desirable water distribution can be obtained in a fuel cell series stack after shutdown by ensuring that an appropriate temperature difference is maintained across the cells in the stack as it cools during the shutdown. In this way, the remaining water in a solid polymer electrolyte fuel cell stack can be concentrated in a selected set of colder flow fields and dealt with appropriately, while still maintaining sufficient water in the membrane electrolyte for purposes of conductivity.

In one aspect of the present invention, a fuel cell stack comprises a plurality fuel cells interposed between first and second end plates; a thermal mass interposed between the first end plate and the fuel cell at one end of the stack; a first insulating layer interposed between the first end plate and the thermal mass; and, a second insulating layer surrounding the plurality of fuel cells. The size of the thermal mass is selected such that water is transferred from the membrane electrode assemblies to one of the anode and cathode flow fields of the fuel cells during shutdown of the fuel cell stack. The insulation and thermal mass at the hot end of the stack is such that the adjacent end cell in the stack stays suitably warm with respect to its neighbors during the cool-down period. In some embodiments, the insulation provided at the sides of the stack is such that the thermal conductance through the stack perpendicularly and out the cool end is much greater than the thermal conductance through the stack laterally and out the insulated sides.

In another aspect of the present invention, a method of shutting down a fuel cell stack comprises: ceasing generation of electricity from the stack; contacting the fuel cell at one end of the stack with a thermal mass; allowing the stack to cool over a cool-down period; and, maintaining a temperature difference across each fuel cell such that water is transferred from the membrane electrode assemblies to one of the anode and cathode flow fields in each of the plurality of fuel cells during the cool-down period.

In a further aspect of the present invention, a method of shutting down a fuel cell stack comprises: ceasing generation of electricity from the stack; allowing the stack to cool over a cool-down period; supplying a gas to the gas inlet of the enclosure at a first temperature lower than a fuel cell stack temperature and exhausting the gas from the gas outlet at a second temperature higher than the first temperature; and, maintaining a temperature difference between the cathode side and the anode side of each fuel cell during the cool-down period, wherein the direction of the temperature difference in each fuel cell is the same. That is, either the cathode is hotter than the anode in each cell during the cool-down period or vice versa. In some embodiments, employing a thermal mass and/or insulating the fuel cell stack may not be necessary to obtain the desired temperature profile within the stack during cool-down.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF THE INVENTION

Figure 1:
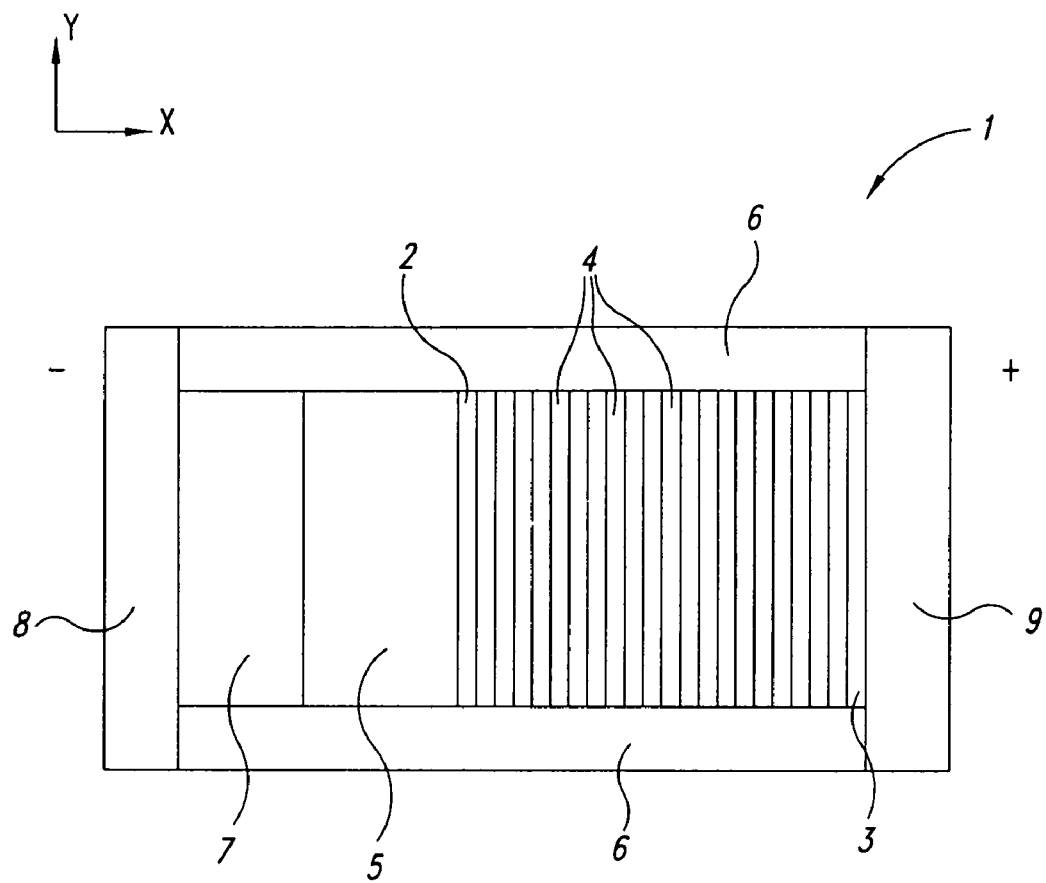
FIG. 1 shows a schematic diagram of a solid polymer electrolyte fuel cell stack according to an embodiment of the present invention.

In the following description, certain specific details are set forth in order to provide a thorough understanding of the various embodiments of the invention. However, one skilled in the art will understand that the invention may be practiced without these details. In other instances, well-known structures associated with fuel cells and fuel cell stacks, such as plates, manifolds, and reactant delivery systems have not been shown or described in detail to avoid unnecessarily obscuring descriptions of the embodiments of the invention.

Unless the context requires otherwise, throughout the specification and claims which follow, the word "comprise" and variations thereof, such as, "comprises" and "comprising" are to be construed in an open, inclusive sense, that is as "including, but not limited to."

The shutdown method of the invention is particularly useful for achieving a desired water distribution in a SPE fuel cell stack. An exemplary SPE fuel cell stack is shown schematically in FIG. 1. The stack is conventional except that it is equipped with additional thermal insulation (on all sides and on the anode or "hot" end of the stack) and an additional thermal mass (also on the anode or "hot" side).

Stack 1 comprises a plurality of stacked cells including "hot" and "cold" end cells 2 and 3 respectively at the negative and positive ends of stack 1. In between is a plurality of similar cells 4. Each cell comprises a solid polymer electrolyte membrane (not shown). Suitable catalyst layers serve as the anode and cathode in each cell and are applied to opposing faces of each membrane. Each cell also comprises anode and cathode gas diffusion layers. And, adjacent to the gas diffusion layers in each cell are anode and cathode flow field plates, respectively. Each plate comprises anode flow field channels and cathode flow field channels, respectively. In a typical embodiment, each anode flow field plate (other than that in end cell 2) also contains coolant flow field channels. Negative and positive bus plates and compression plates (not shown) are typically provided along with a pair of end plates 8, 9 at the hot and cold end of the stack respectively. Fluids are supplied to and from the reactant and coolant flow fields via various ports and manifolds (not shown).

In accordance with the invention, the stack comprises additional thermal mass 5 adjacent end cell 2, thermal insulation 6 on all sides of stack 1, and thermal insulation 7 at the hot end adjacent thermal mass 5. The thermal mass is preferably in good thermal contact with the hot end of the stack (i.e., preferably a low thermal resistance between the end of the stack the thermal mass). In FIG. 1, the x and y axes shown indicate directions normal to and parallel to the stack direction respectively.

When stack 1 is shutdown, the generation of electricity is stopped and the stack is simply allowed to cool over a cool-down period. The design of stack 1 is such that heat is predominantly lost through end plate 9 (i.e., in the x direction) and heat is retained at all the other sides of the stack. Additional thermal mass 5 provides a heat reservoir that compensates for the heat loss that does occur in practice at the "hot" end, notwithstanding the insulation present. This design establishes a decreasing temperature profile across the stack during the cool-down period. In certain embodiments, the temperature may decrease monotonically across the stack during cool-down.

The thermal mass 5 and thermal insulation 6, 7 required are a function of the size and design of the stack. In the Examples that follow, values for certain specific cases were determined using the model provided. Those of ordinary skill in the art will be able to apply similar modeling principles to other stack designs and operating conditions and thus obtain appropriate values for these cases too.

In general, it should be noted the thermal conductance of the stack in the y direction is typically too large relative to the x direction. Thus, insulation is needed at the sides such that heat is mainly lost through the cool end of the stack, as opposed to out the insulated sides. The insulation and thermal mass at the hot end of the stack are such that the adjacent end cell 2 in the stack stays suitably warm with respect to its neighbors during the cool-down period. In practice, we have found that the desired results can be obtained in actual automotive fuel cell stack embodiments without using an impractically large thermal mass or an unrealistic amount of insulation. End plate 9 on the other hand is selected to be a good radiator and thus is preferably a thermally conductive material with good properties for heat rejection via radiation and/or convection. In certain embodiments, end plate 9 may further comprise heat exchange elements, such as fins or plates, or passages for coolant fluids, if desired.

The stack of FIG. 1 represents a practical design that passively provides for a desired water distribution during shutdown and thus for improved startup following storage at below freezing temperatures. Note that in the embodiment of FIG. 1, the anodes are kept hotter than the cathodes during cool-down. This is of course done when it is preferred to move liquid water to the cathode plates (e.g., when the water collected at the cathode side can be accommodated without blocking the cathode flow fields and without causing a problem if frozen during storage, or alternatively if the cathode flow field is readily drained or purged of water during cool-down). In other embodiments however, it may be preferable to move the water to the anode plates (e.g., if anode purging were employed during shutdown). The choice will again depend on the specific fuel cell system design and operating conditions.

Figure 2A:
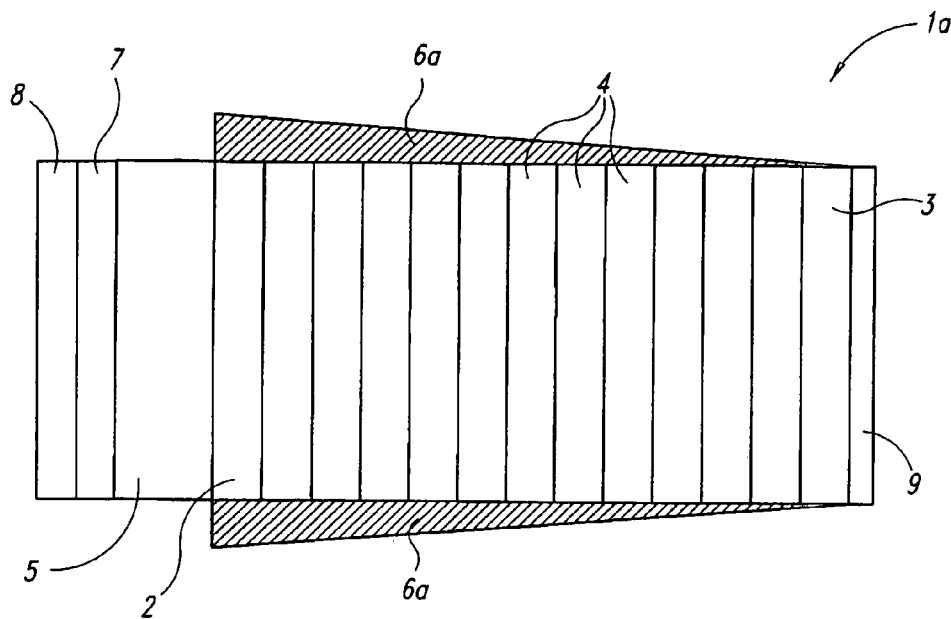
FIG. 2a is a schematic diagram of a fuel cell stack according to another embodiment of the present invention.
Figure 2B:
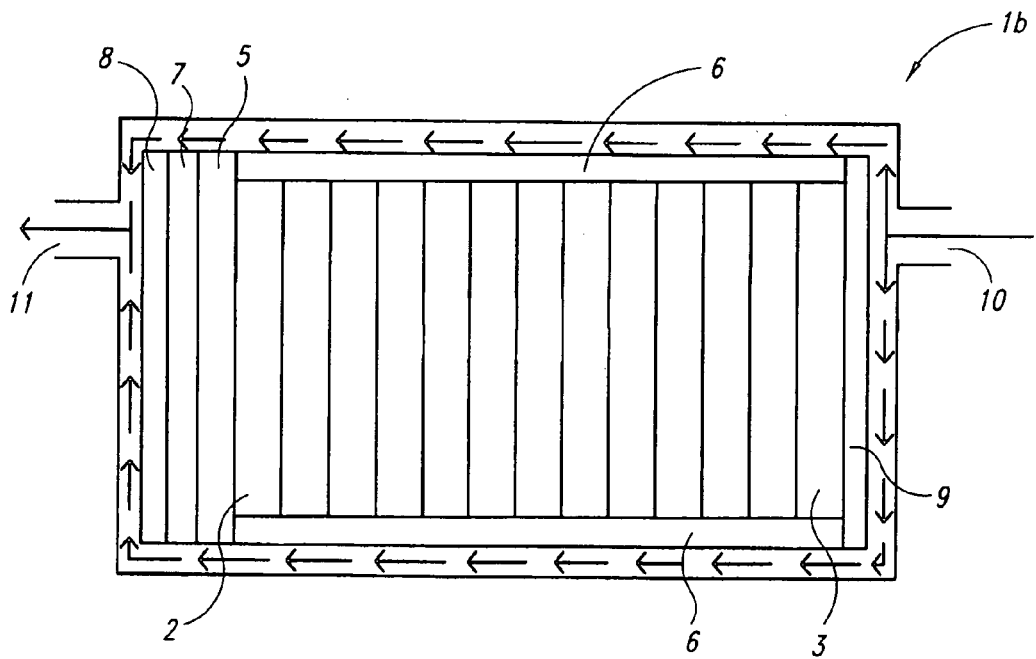
FIG. 2b is a schematic diagram of a fuel cell stack and shutdown method according to further embodiments of the present invention.

FIGS. 2a and 2b schematically depict embodiments of the invention in which the thermal gradient in the stack is enhanced. The embodiment in FIG. 2a is similar to that in FIG. 1 except that thermal insulation 6a of variable thickness is employed on the sides of stack 1a. Thermal insulation 6a diminishes in thickness (e.g., linearly as shown) towards the cold end of the stack. The embodiment in FIG. 2b is similar to that in FIG. 1 except that the sides of the stack are cooled in a variable manner. (In this embodiment, insulation may not be needed along the sides and end of the stack.) Stack 1b is enclosed and a coolant fluid (e.g., air) enters at inlet 10 at the cold end, is directed through the enclosure, and exits at outlet 11 at the hot end. The coolant thus progressively cools the stack with diminishing cooling effect as it travels through the enclosure, thereby cooling the cold end more than the hot end.

The following examples are provided to illustrate certain aspects and embodiments of the invention but should not be construed as limiting in any way.

Example 1

Model Validation

In this Example, a one-dimensional heat and water transfer model was developed to model the water distribution in a fuel cell stack as it cools naturally during shutdown. A high aspect ratio SPE fuel cell stack was also made to determine the actual water distribution and to validate the model.

Model

In the following, a one-dimensional unsteady heat conduction model was used to determine the temperature and the temperature differential across a cell as a function of time and location in stack. Then, the water transfer across a membrane electrode assembly, MEA, during natural cooling of the partially insulated stack was modeled using a previously determined empirical correlation for water transfer rate as a function of temperature and temperature gradient. (This correlation was determined by measuring the amount of water transferred in a cell from one flow field plate to the opposing flow field plate when a specific temperature gradient was established it. Interestingly, it was found that the amount of water transferred was about the same whether the MEA was initially wet or dry.)

For simplicity, the "cold" or cathode end stack hardware was not considered in the model and cooling of the stack was described using a heat transfer coefficient that was fitted so that the model and experimental heat transfer results were in good agreement. In the following, T is temperature, t is time, and x is the perpendicular distance along the stack (i.e., the x direction shown in FIG. 1). L is the length of the stack and so x=0 represents the "hot" or anode end of the stack (i.e., the anode side of end cell 2) and x=L represents the "cold" or cathode end of the stack (i.e., the cathode side of end cell 3). In addition, α is the cell thermal diffusivity, h is the heat transfer coefficient, and k is the cell thermal conductivity. The heat transfer model is then based on the following equations:

Governing Equation:

$$\frac{\partial T}{\partial t} = \alpha \frac{\partial^2 T}{\partial x^2}$$

Initial Condition:

$$T = T_{initial} \text{ at } t = 0 \text{ for } 0 < x < L$$

Boundary Conditions:

$$\frac{\partial T}{\partial x} = 0 \text{ at } x = 0 \text{ for } t > 0$$

$$k\frac{\partial T}{\partial x} = h(T_{ambient} - T) \text{ at } x = L \text{ for } t > 0$$

The following parameters were used in the model and were representative of the experimental stack of this Example.

| Symbol | Description | Value | Unit |
| --- | --- | --- | --- |
| h | Heat transfer coefficient (fitted) | 16 | W/(m²K) |
| k | Cell thermal conductivity | 2 | W/(mK) |
| L | Stack length | 5 | cm |
| $T_{initial}$ | Stack temperature before shutdown | 57 | ° C. |
| $T_{ambient}$ | Ambient air temperature | 25 | ° C. |
| α | Cell thermal diffusivity* | 1.7 * 10⁻⁶ | m²/s |

*α was derived here by fitting experimental startup data to a model for the temperature increase of the stack.

The water transfer in a cell from plate to plate was modeled using a previously determined empirical correlation for water transfer rate as a function of temperature and temperature gradient. In the following, ΔT is the temperature differential across one cell in the stack (in the experimental stack of this Example, this is equivalent to the temperature differential over about 2.5 mm in the x direction).

Water Transfer Rate in one cell:

$$w(T, \Delta T) = 0.065 * \Delta T * \exp(0.04 * T - 2.7) \quad \left(\frac{g}{\min}\right)$$

Total water transferred through MEA:

$$m_w(t) = \int_0^t w(T, \Delta T) dt \quad (g)$$

Experimental Stack

The stack comprised 20 cells in series and were of a size suitable for automotive applications. The MEAs in the cells comprised NAFION® N112 perfluorosulfonic acid membrane electrolyte with carbon supported Pt/Ru catalyst applied on one face and carbon supported Pt catalyst on the other face to serve as anode and cathode electrodes respectively. The MEAs also comprised polytetrafluoroethylene (PTFE) impregnated carbon fibre paper substrates to serve as gas diffusion layers on each side of the catalyst coated membrane electrolyte. Grafoil® graphite reactant flow field plates with linear flow channels formed therein were located on either side of the MEAs, thereby completing the fuel cell assembly.

The stack was insulated in a manner similar to that shown in FIG. 1 but no additional thermal mass 5 was included near end cell 2. Conventional aluminum plates were used at both ends of the stack. (The plate at the "hot" end was electrically insulated from the stack in this Example.) The thermal insulation used was a layer of thick (~2 cm) foam insulation (very low thermal conductivity of about 0.04 W/(mK)) and was employed adjacent the aluminum plate at the "hot" end and also along all the sides of the fuel cell stack. In order to measure the temperature gradient, thermocouples were placed at various points along the length of the stack.

The stack was then operated under typical conditions, in this case for an hour at a 50 A load, with air oxidant supplied at 20 psi, coolant at 60° C., and wet conditions (i.e., with a dew point of 70° C. at both anode and cathode inlets). The stack was then turned off and allowed to cool naturally. Temperatures were measured while the stack cooled. After 12 hours of cooling, the stack was disassembled and the amount of water contained in the MEA of several cells was measured. (This was done by cutting out circular pieces from the MEA and comparing the weight of the "wet" pieces to their weight after they had been completely dried.)

Figure 3:
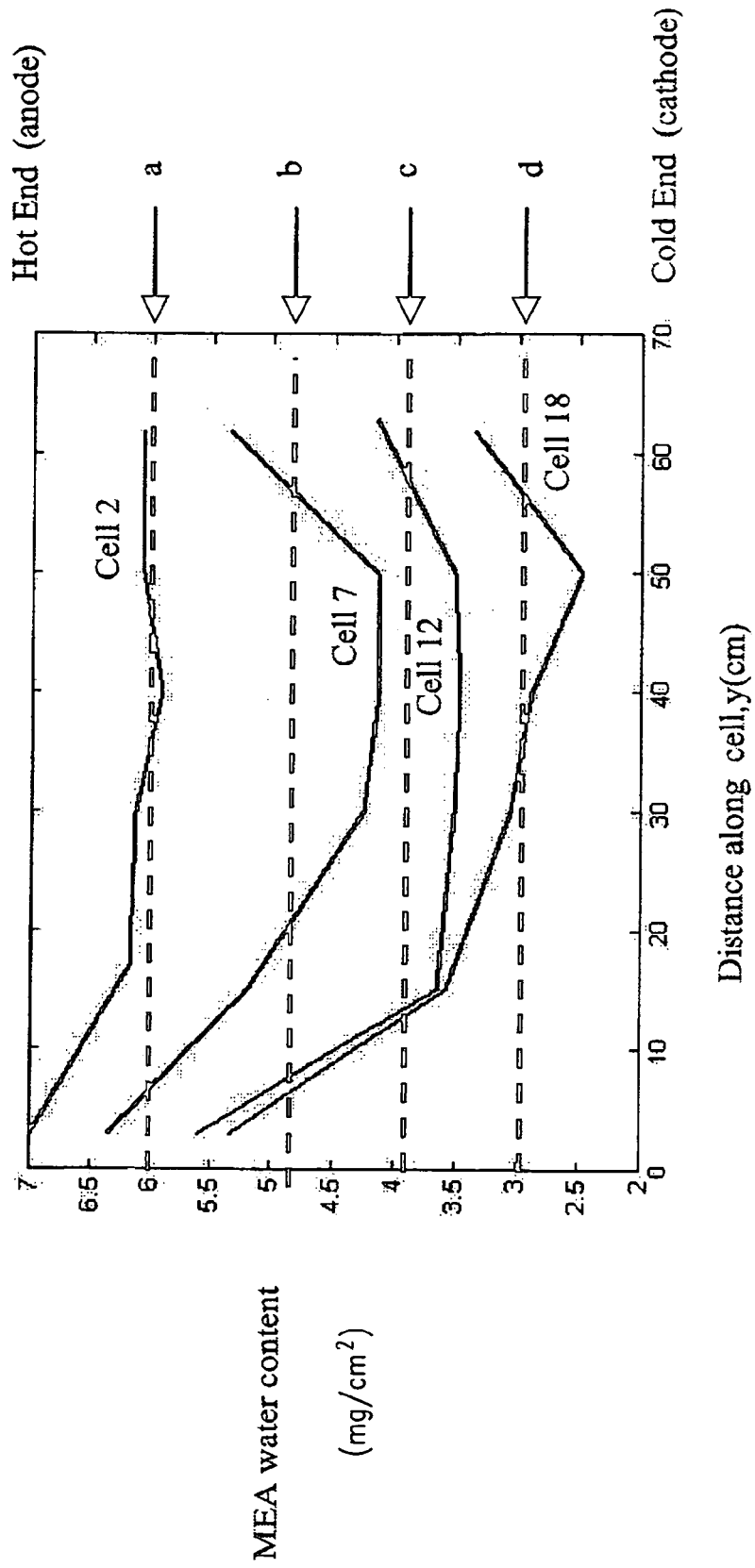
FIG. 3 shows the MEA water content of four cells versus distance along the cell in the y direction of the stack in Example 1.

FIG. 3 shows the MEA water content of four cells (number 2, 7, 12, and 18 starting from the hot or anode end) versus distance along the cell in the y direction (see FIG. 1). The water content decreases significantly for cells closer to the cold end of the stack. The average water content over the whole MEA is depicted in FIG. 3 by the dashed lines a, b, c, and d for the four different cells. In previous analyses of similar stacks operating under similar conditions, the average water content immediately after shutdown of all cells was found to be about 6 mg/cm$^2$. In FIG. 3, cell 2 still has about 6 mg/cm$^2$ of water. However, the other cells have less. For the stack of this Example, during normal operation and immediately after shutdown, the water in the MEA is mainly contained in the cathode electrode. The water loss observed here is thus indicative of water that has migrated mainly from the cathode electrodes to the cathode flow fields during natural cooling. (Visually, the cathode flow fields nearer the cold end of the stack showed large amounts of liquid water, thereby corroborating the results shown in FIG. 3.) The total amount of water, m$_w$, transferred to the cathode flow field in a given cell is then determined by multiplying the active area of the cell by the difference between the water content (6 mg/cm$^2$) immediately after shutdown and the average water content shown in FIG. 3.

Figure 4:
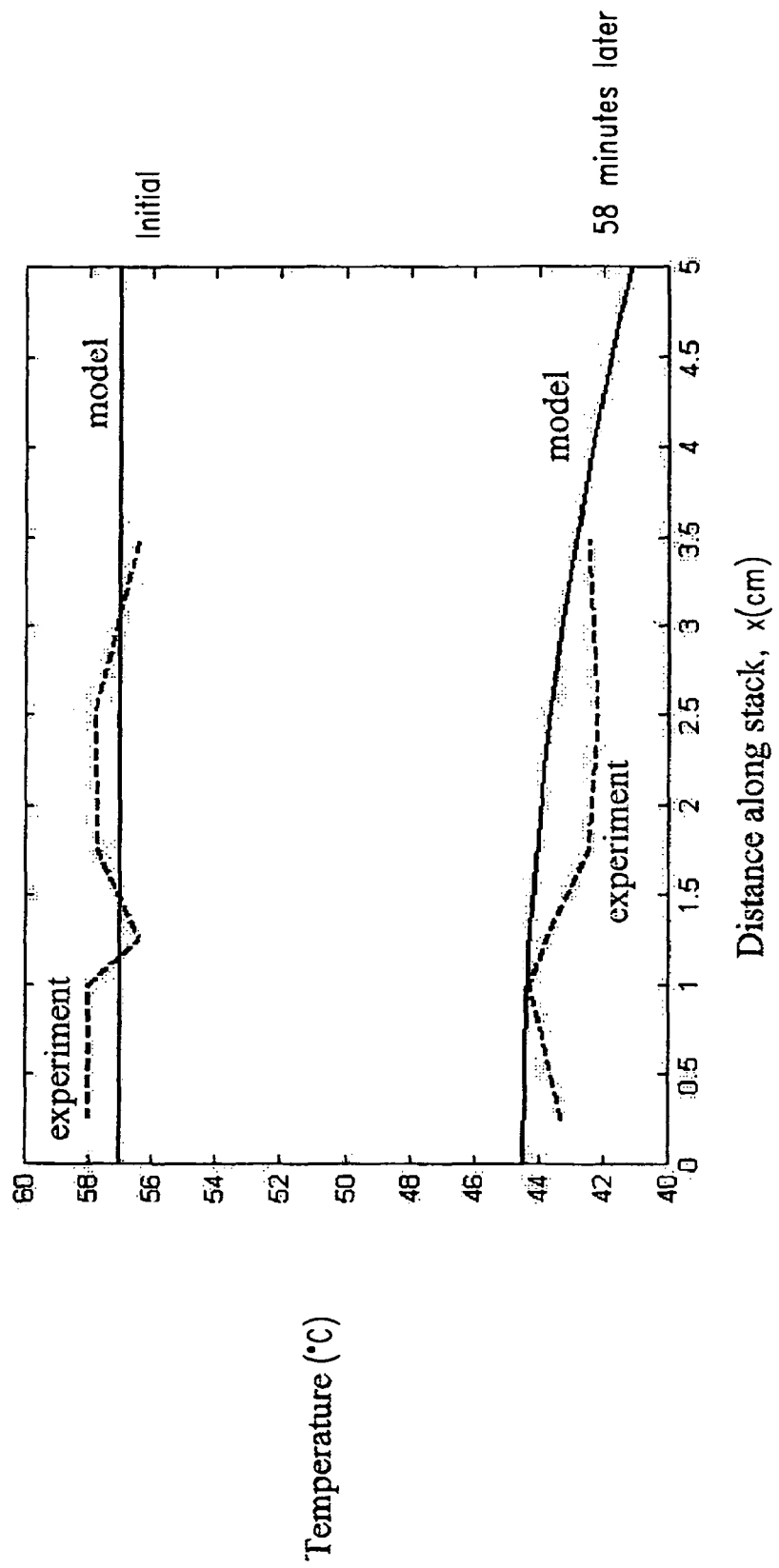
FIG. 4 compares the model and experimental results for the temperature profile along the stack of Example 1.
Figure 5:
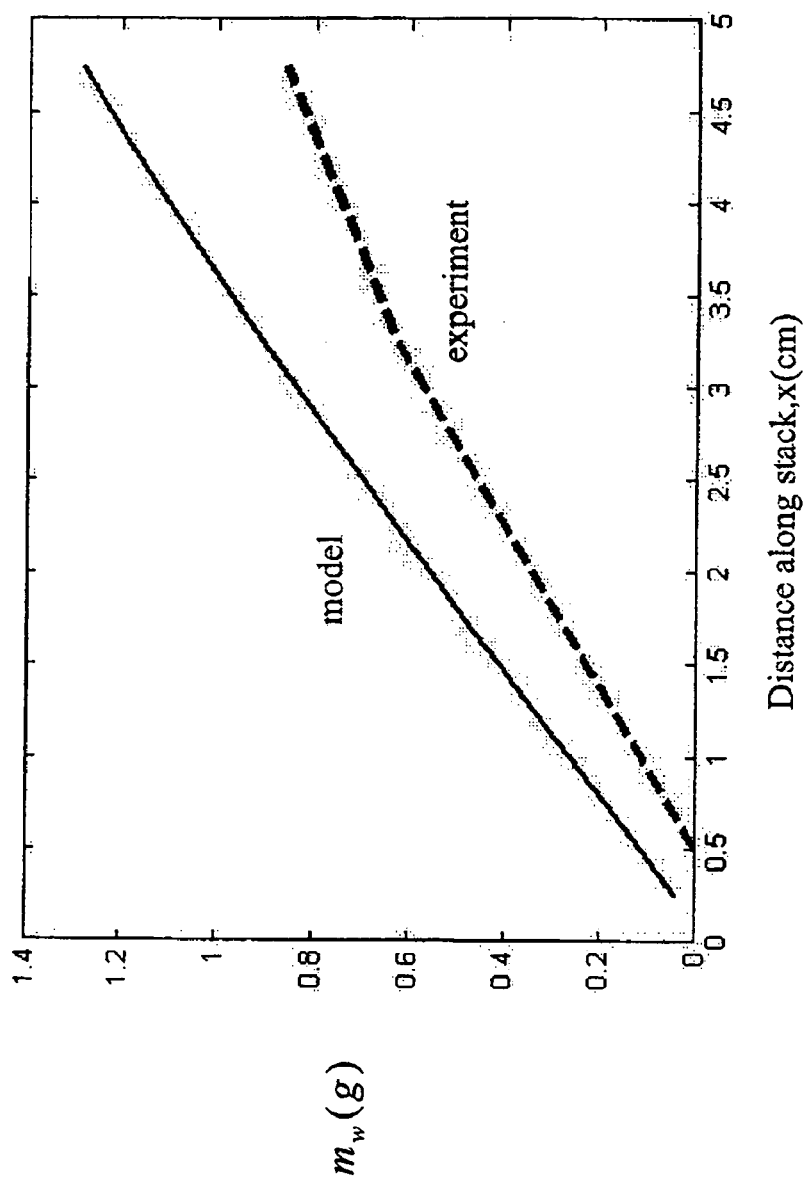
FIG. 5 compares the model and experimental results for the MEA water content transferred along the length of the stack of Example 1.

FIGS. 4 and 5 compare the results obtained using the above model to the results obtained experimentally (via the thermocouples and the values in FIG. 3) for the stack temperatures and water content transferred. FIG. 4 shows the temperature profile along the stack initially after shutdown and then also about 1 hour later. The model results and experimental results are shown in the solid and dashed lines respectively. The temperature dropped about 14° C. after one hour but the gradient across the stack is relatively small. FIG. 5 shows the water content transferred from the MEA to the cathode flow field, m$_w$, along the length of the stack (x direction) after 12 hours of natural cooling. While a significant amount of water is transferred near the cold end of the stack, the amount of water transferred near the hot end (especially at the end cell) is not adequate for purposes of obtaining a significant improvement in freeze start performance overall (i.e., in all the cells in the stack).

Good agreement, however, is obtained between the model and experimental results in both FIGS. 4 and 5. The model above, therefore, is predictive and thus can be used to select a suitable thermal mass, insulation amounts, etc. for the stack such that sufficient water is transferred during shutdown for all cells within.

Example 2

In this Example, a model similar to the above was used to select a thermal mass suitable to effect an adequate water transfer in all the cells in the stack as it cooled during shutdown. The thermal mass would be located adjacent the end cell at the hot end of the stack. An experimental stack with the selected thermal mass was then made and the results upon shutdown were compared to those predicted by the model. The experimental stack was similar to that employed in the Example 1 except 1) for the inclusion of the thermal mass, 2) that thicker thermal insulation was used, 3) that the aluminum plate used at the cold end of the stack had better heat rejection characteristics, and 4) that the polarity of the stack was reversed (i.e., the hot end was the cathode end, and the cold end was the anode end).

Model

The model used here was similar to that used in the preceding Example except that it took into account a significant thermal mass included at the hot (cathode) end of the stack. In the heat transfer part of the model then, a thermal mass of thickness L$_a$ is located between —L$_a$ and 0 along the x axis. The heat transfer model here then is based on the following equations:

Governing Equation:

$$\frac{\partial T}{\partial t} = \alpha_s \frac{\partial^2 T}{\partial x^2} \quad \text{for } 0 < x < L_s$$

$$\frac{\partial T}{\partial t} = \alpha_a \frac{\partial^2 T}{\partial x^2} \quad \text{for } -L_a < x < 0$$

Initial Condition:

$$T = T_{initial} \quad \text{at } t = 0 \quad \text{for } -L_a < x < L_s$$

Boundary Conditions:

$$\frac{\partial T}{\partial x} = 0 \quad \text{at } x = -L_a \quad \text{for } t > 0$$

-continued $$k_a \frac{\partial T}{\partial x} = k_s \frac{\partial T}{\partial x} \text{ at } x = 0 \text{ for } t > 0$$

$$k_s \frac{\partial T}{\partial x} = h(T_{ambient} - T) \text{ at } x = L_s \text{ for } t > 0$$

For convenience, an aluminum block was chosen for use as the thermal mass (although other materials could easily have been used). For better heat rejection via radiation, the aluminum plate at the cold (anode) end of the stack was made black. The following parameters were thus used in the model and were representative of the experimental stack of this Example.

| Symbol | Name | Value | Unit |
|---|---|---|---|
| h | Heat transfer coefficient | 36 | W/(m²K) |
| $k_a$ | Aluminum thermal conductivity | 204 | W/(mK) |
| $k_s$ | Cell thermal conductivity | 3 | W/(mK) |
| $L_a$ | Aluminum block thickness | 0-10 | cm |
| $L_s$ | Stack length (20 cells) | 5 | cm |
| $T_{initial}$ | Stack & aluminum block temperature before shutdown | 66 | °C. |
| $T_{ambient}$ | Ambient air temperature | 21 | °C. |
| $\alpha_a$ | Aluminum thermal diffusivity | 8.4 * 10⁻⁵ | W/(mK) |
| $\square_s$ | Cell thermal diffusivity | 1.6 * 10⁻⁶ | m²/s |

Figure 6:
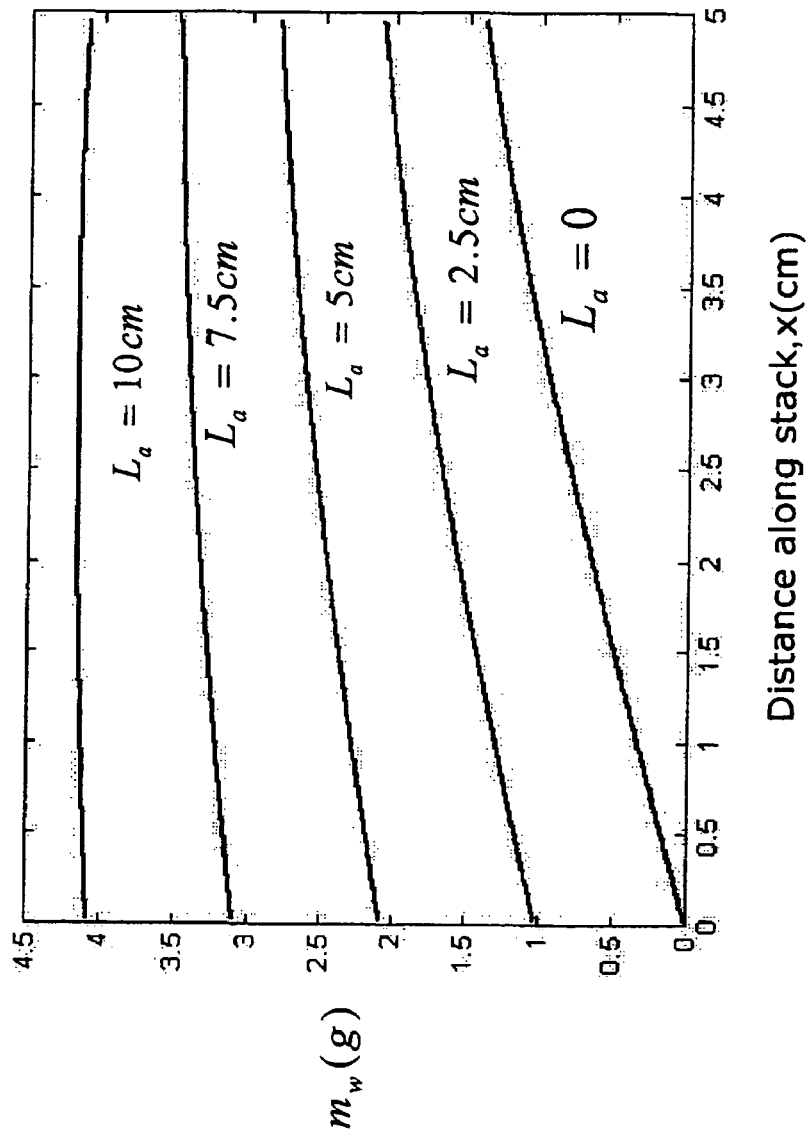
FIG. 6 shows the calculated water transfer as a function of distance along the x direction in the stack after 12 hours of natural cooling for different thicknesses of the aluminum block/thermal mass.

The above model was used to calculate the water transferred from the MEAs to the cathode flow field plates in the cells in the stack after 12 hours of natural cooling. The results as a function of distance along the x direction of the stack are shown in FIG. 6 for different thicknesses of the aluminum block/thermal mass. As is evident in FIG. 6, the thickness of the aluminum block has a marked impact on the water transferred. As mentioned above, the average water content in the MEA is about 6 mg/cm² or 1.7 g. The total water content in the cells however is about 2-2.5 g. Most of this additional water outside the MEA is situated in the cathode flow field plate. The model indicates that more than 2.5 g of water should be transferred in all the cells of the stack if an aluminum block of 7.5 cm thickness was employed. Thus, using an aluminum block of this thickness should result in a transfer of all the water from the MEAs to the anode plates for all the cells in the stack during cool-down.

Experimental Stack

In the experimental stack of this Example, the polarity of the stack was reversed compared to that of the Example 1 (i.e., the hot end was the cathode end, and the cold end was the anode end). An aluminum block of 7.5 cm thickness was also employed as an additional thermal mass 5 here. The block was located between the foam insulation and the hot cathode end of the stack. In addition, thicker foam insulation (~5 cm) was employed adjacent the thermal mass 5 and also along all the sides of the fuel cell stack. Finally, at the "cold end" of the stack, an aluminum plate was used adjacent end cell 3 as before but the plate was painted black for better radiative heat rejection.

The stack was then operated under typical conditions as before, in this case at 200 A load. The stack was then turned off and allowed to cool naturally for 3 hours. Again, temperatures were measured while the stack cooled and after the 3 hours of cooling, the stack was disassembled and the amount of water contained in the MEA of several cells was measured.

Figure 7:
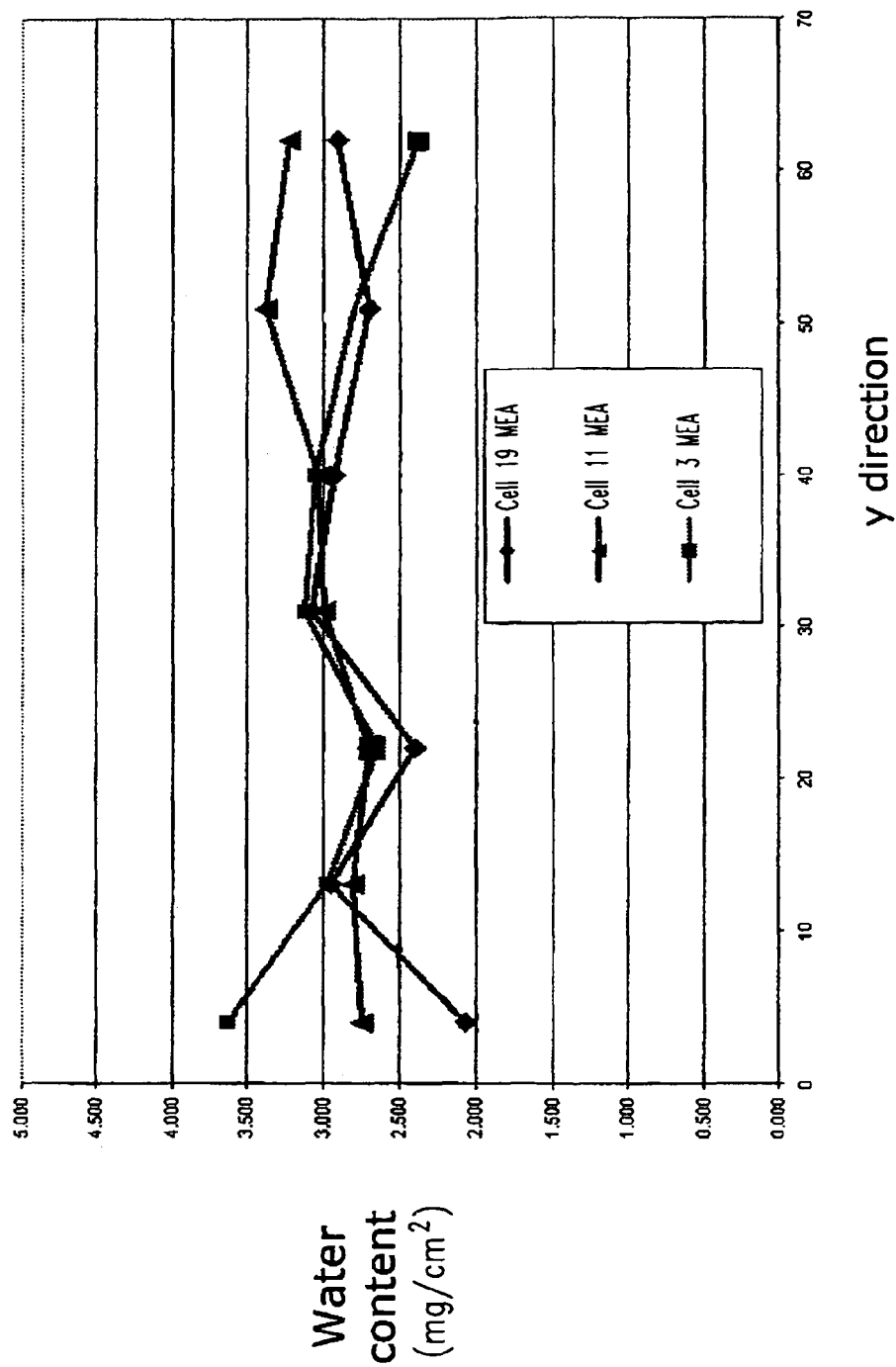
FIG. 7 shows the MEA water content as determined from three cells taken from the stack of Example 2 as a function of distance along the y direction after 3 hours of cool-down.

FIG. 7 shows the MEA water content of three cells (number 2, 10, and 18 starting from the hot or cathode end) versus distance along the cell in the y direction (see FIG. 1). The water content was essentially the same across each cell and also from cell to cell. The amount of about 3 mg/cm² (or about 0.9 g) is about half of the initial amount in the MEA suggesting that at least about half of the water in the MEA has transferred to the anode flow field plates in all the cells.

Visual inspection qualitatively confirmed that water had transferred in all the cells in the stack. When such stacks are initially shutdown, the anode plates are typically dry and the cathode plates are wet. However, after the 3-hour cool-down in this case, the results were reversed, with the cathode plates being dry and the anode plates showing visible slugs of water.

Figure 8:
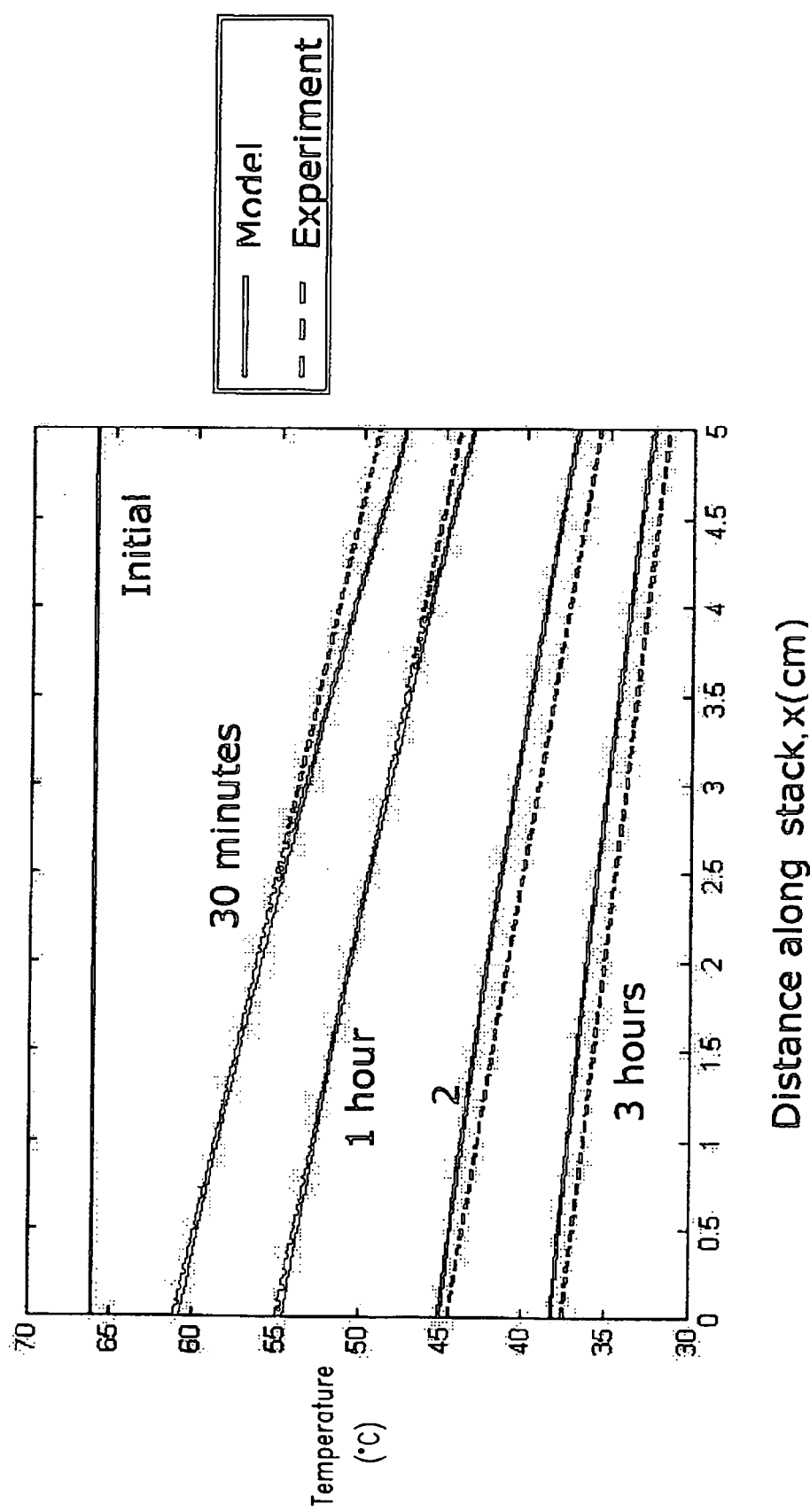
FIG. 8 compares the calculated and experimental temperature distributions at various times during the 3-hour cool-down period for the stack of Example 2.

Using the same 7.5 cm thick aluminum block in the preceding heat and water transfer model, the temperature distribution as a function of time was calculated and compared to the experimental data obtained. FIG. 8 compares the temperature distributions at various times during the 3-hour cool-down period. There is good agreement between the model and experimental results. As is evident from FIGS. 4 and 8, the inclusion of the aluminum block and additional insulation results in a larger temperature differential across the stack and in one that lasts much longer.

Figure 9:
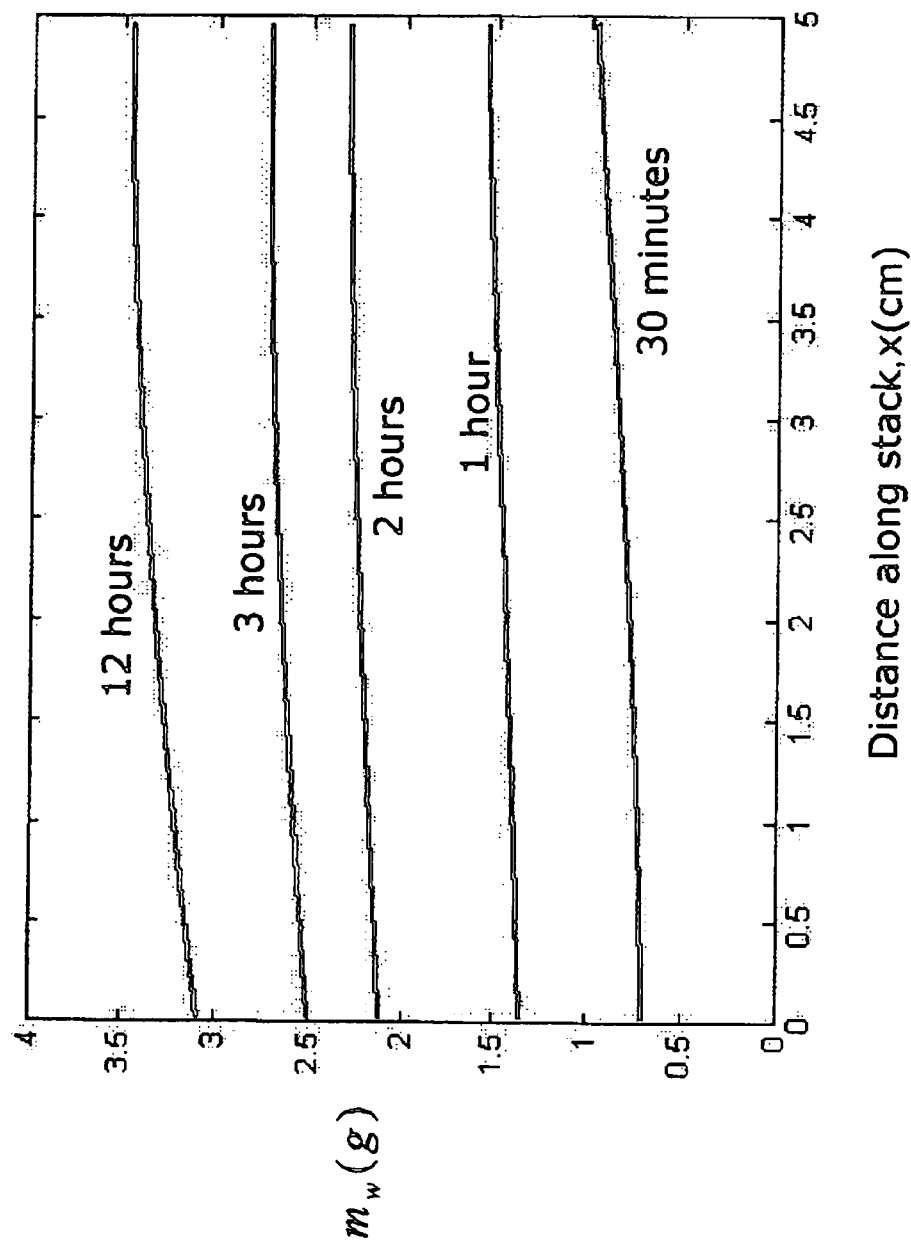
FIG. 9 shows the calculated amount of water transferred along the x-axis of the stack of Example 2 after five different time periods.

Also using the model, the water transfer distribution across the stack was calculated at various times during a hypothetical 12-hour cool-down period. FIG. 9 shows the amount of water transferred along the x-axis of the stack after five different time periods. (The 12-hour curve in FIG. 9 is the same as the 7.5 cm thick block curve in FIG. 6. The polarity reversal does not affect the calculated transfer rate in a cell.) Since the actual water content in the cells in the stack is only about 2.5 g (determined empirically as mentioned above), FIG. 9 suggests that most of the water in each cell should transfer over in about 3 hours. Visual observations in the experimental stack confirmed that most of the water was removed from the cathode flow field plates. And FIG. 7 data shows that only about 3 mg/cm² or about 0.9 g of water remains in the MEA of each cell. Thus, most of the water appears to have moved to the anode flow field plates within 3 hours of cool-down, in agreement with the model.

The above Examples show how use of an additional thermal mass and thermal insulation can result in a desirable water distribution in an actual automotive type fuel cell stack upon shutdown. The model used is reasonably predictive and those of ordinary skill can be expected to use such a model to select appropriate designs for other types of stacks. In the preceding, an aluminum block was employed as a thermal mass. However, in practical automotive or other stack designs, it may be advantageous to incorporate the necessary thermal mass into the stack hardware (e.g., manifolds) or employ at least a portion of the stack coolant as the thermal mass.

All of the above U.S. patents, U.S. patent application publications, U.S. patent applications, foreign patents, foreign patent applications and non-patent publications referred to in this specification and/or listed in the Application Data Sheet, are incorporated herein by reference in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A fuel cell stack comprising:
    first and second end plates, the second end plate having a heat rejection surface;
    a plurality of fuel cells interposed between the first and second end plates and including an end cell associated with the first end plate, each fuel cell having a membrane electrode assembly having a cathode side and an anode side interposed between anode and cathode flow fields, respectively;

a thermal mass interposed between the first end plate and the end cell and in thermal communication with the end cell;

a first insulating layer interposed between the first end plate and the thermal mass; and a second insulating layer surrounding the plurality of fuel cells, wherein the size of the thermal mass and the sizes of the first and second insulation layers are selected such that water is passively transferred from the membrane electrode assemblies to one of the anode and cathode flow fields in each of the plurality of fuel cells during shutdown of the fuel cell stack, and wherein the thermal mass acts as a heat reservoir that establishes a decreasing temperature profile across the stack during shutdown of the fuel cell stack.

2. The fuel cell stack of claim 1 wherein the size of the thermal mass is equivalent to at least five of the plurality of fuel cells.

3. The fuel cell stack of claim 1 wherein the thermal mass comprises a layer of metal.

4. The fuel cell stack of claim 3 wherein the metal comprises aluminum.

5. The fuel cell stack of claim 1, further comprising a manifold for supplying or exhausting process fluids to or from the plurality of fuel cells, wherein the thermal mass is incorporated into at least a portion of the manifold.

6. The fuel cell stack of claim 1 wherein the plurality of fuel cells is arranged in a stacking direction from the first end plate to the second end plate, and a thermal conductance of the second insulating layer increases in the stacking direction.

7. The fuel cell stack of claim 6 wherein the plurality of fuel cells is arranged in a stacking direction from the first end plate to the second end plate, and a thickness of the second insulating layer decreases in the stacking direction.

8. The fuel cell stack of claim 1 wherein the heat rejection surface comprises a heat exchange element.

9. The fuel cell stack of claim 1, further comprising an enclosure having a gas inlet proximate to the second end plate and a gas outlet proximate to the first end plate for supplying and exhausting a coolant gas to and from the enclosure.

* * * * *